W. R. BAKER.
SWAY BAR GUIDES FOR HARVESTERS.
No. 170,804. Patented Dec. 7, 1875.
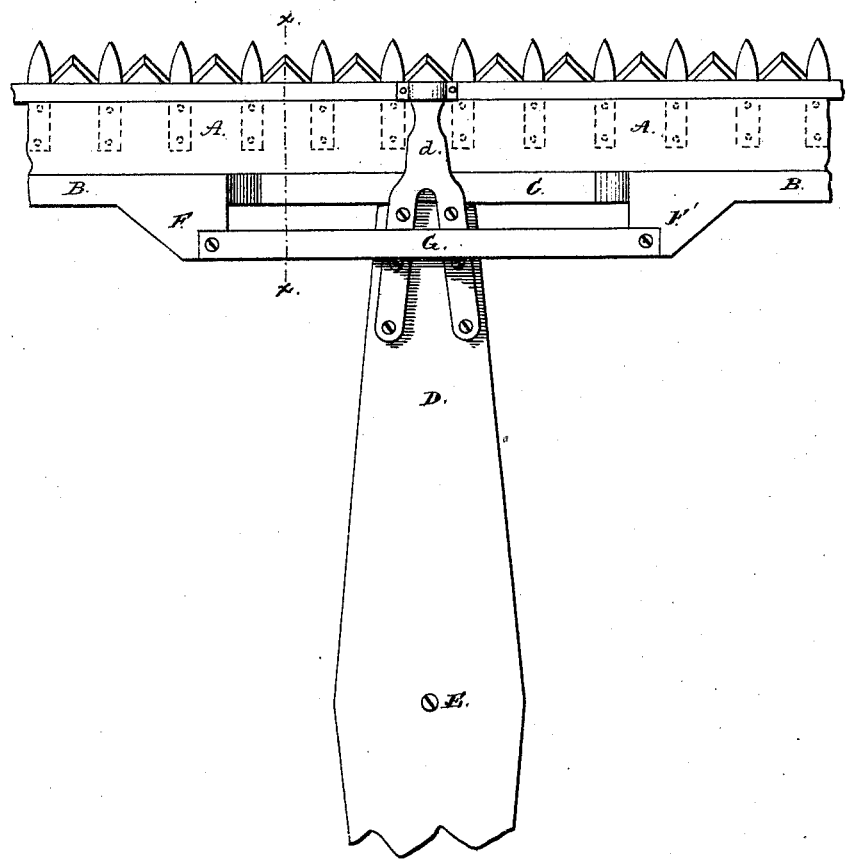
Witnesses:
E. C. Davidson
H. T. Earnest
Inventor:
Wm R. Baker
By his Attorney

UNITED STATES PATENT OFFICE.

WILLIAM R. BAKER, OF CHICAGO, ILLINOIS, ASSIGNOR TO C. H. & L. J. McCORMICK, OF SAME PLACE.

IMPROVEMENT IN SWAY-BAR GUIDES FOR HARVESTERS.

Specification forming part of Letters Patent No. 170,804, dated December 7, 1875; application filed October 7, 1875.

*To all whom it may concern:*

Be it known that I, WILLIAM R. BAKER, of Chicago, in the county of Cook and State of Illinois, have invented a certain new and useful Improvement in Harvester Sway-Bar Guides, of which the following is a specification:

My invention relates to harvesters and grain-binders of that class in which the cutters are driven by a "sway-bar" or vibrating lever, pivoted beneath the grain-platform or endless apron of the machine.

My object is to prevent the collection and packing of fine grass, leaves, &c., in the guide-way or recess in which the sway-bar works upon the finger-beam, and thus avoid clogging and binding; and to this end my improvement consists of the combination, with a harvester finger-beam, constructed with a recessed longitudinal guide piece or rib at its rear edge, of supports or lugs projecting rearwardly from said beam, and a strap or bar connected at its ends to the lugs in rear of the recess, and in, or nearly in, the same horizontal plane as the top of the guide-piece, whereby a guide for the sway-bar is secured, while ample room for the escape of clogging matter between the guide-strap and guide-piece on the finger-beam is left, as will hereinafter more fully be explained.

In the accompanying drawings, which show so much only of a harvesting-machine as is necessary to illustrate the invention herein claimed—

Figure 1 is a plan view, and Fig. 2 a vertical section, through the guide on the line $x\ x$ of Fig. 1.

A finger-beam, A, is provided with a guide piece or rib, B, at its rear edge, as usual, and with a recess, C, in the guide-piece to receive and allow free play to a metallic arm, $d$, forming the end of a sway-bar, D, pivoted at E in the usual manner.

The arm $d$ is, by preference, forked, as shown, so that it may be securely attached to the front end of the sway-bar by screws or rivets, and fits at its outer or free end in an eye on the sickle-bar or knife-back in a well-known way.

The end of the sway-bar should be rounded, as shown, and work close to the back of the finger-beam.

Lugs or supporting-ledges F F' are formed with or securely attached to the rear edge or back of the finger beam at or near either end of the recess C with their tops about in line with the upper surface of the guide-piece B.

These lugs, as shown, project rearwardly from the finger-beam, and have attached to their upper surfaces a flat bar or strap, G, some distance in rear of the beam and recess C, the ends of the strap being suitably secured to the lugs.

The strap, it will thus be seen, is in the same horizontal plane (or thereabout) as the top of the guide-piece B, and extends across the end of the sway-bar and over the forked end of the arm $d$, bridging over the space between the lugs, and with the recess forming a controlling way or guide, in which the sway-bar plays back and forth during its vibrations, leaving an unobstructed space in rear of the finger-beam, for the escape of clogging matter, (such as fine grass, leaves, &c.,) which, when not allowed to escape, seriously interfere with the operation of the machine.

My improvements are to be used in connection with a fully-organized harvesting-machine, and the sway-bar driven by a crank and pitman in the usual manner.

I do not broadly claim a strap overlying the sway-bar, as this is old; but I am not aware of any sway-bar strap prior to the date of my invention having been arranged in rear of the back of the finger-beam, so as to permit the escape of clogging matter.

I claim as of my own invention—

The combination, substantially as hereinbefore set forth, of the finger-beam, the recessed longitudinal guide-piece thereof, the supports projecting rearwardly from the finger-beam, and the strap or guide-bar secured to these supports in rear of the finger-beam and recess in the guide-piece, whereby an unobstructed space for the escape of clogging matter is provided in rear of the finger-beam in the sway-bar guide.

In testimony whereof I have hereunto subscribed my name.

WM. R. BAKER.

Witnesses:
JOHN V. A. HASBROOK,
F. H. MATTHEWS.